United States Patent Office 2,788,659
Patented Apr. 16, 1957

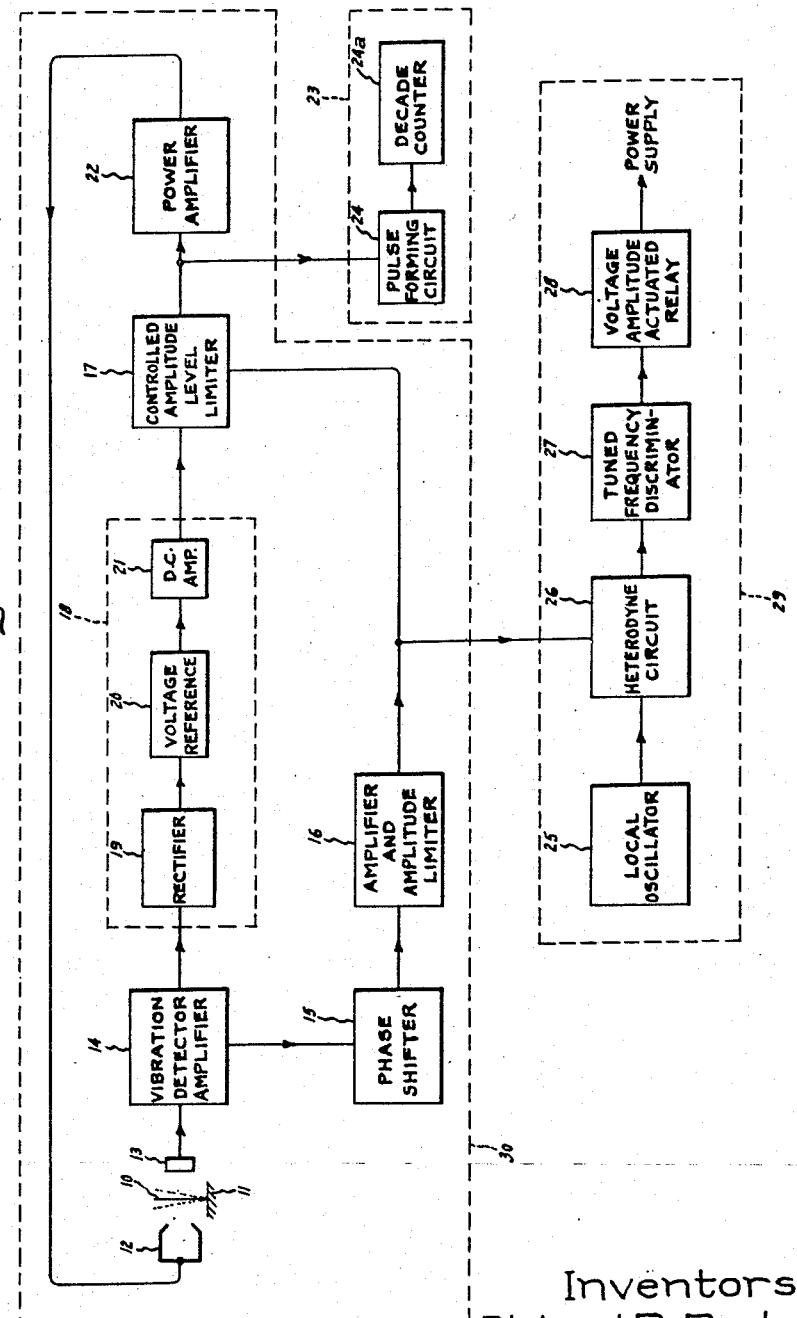

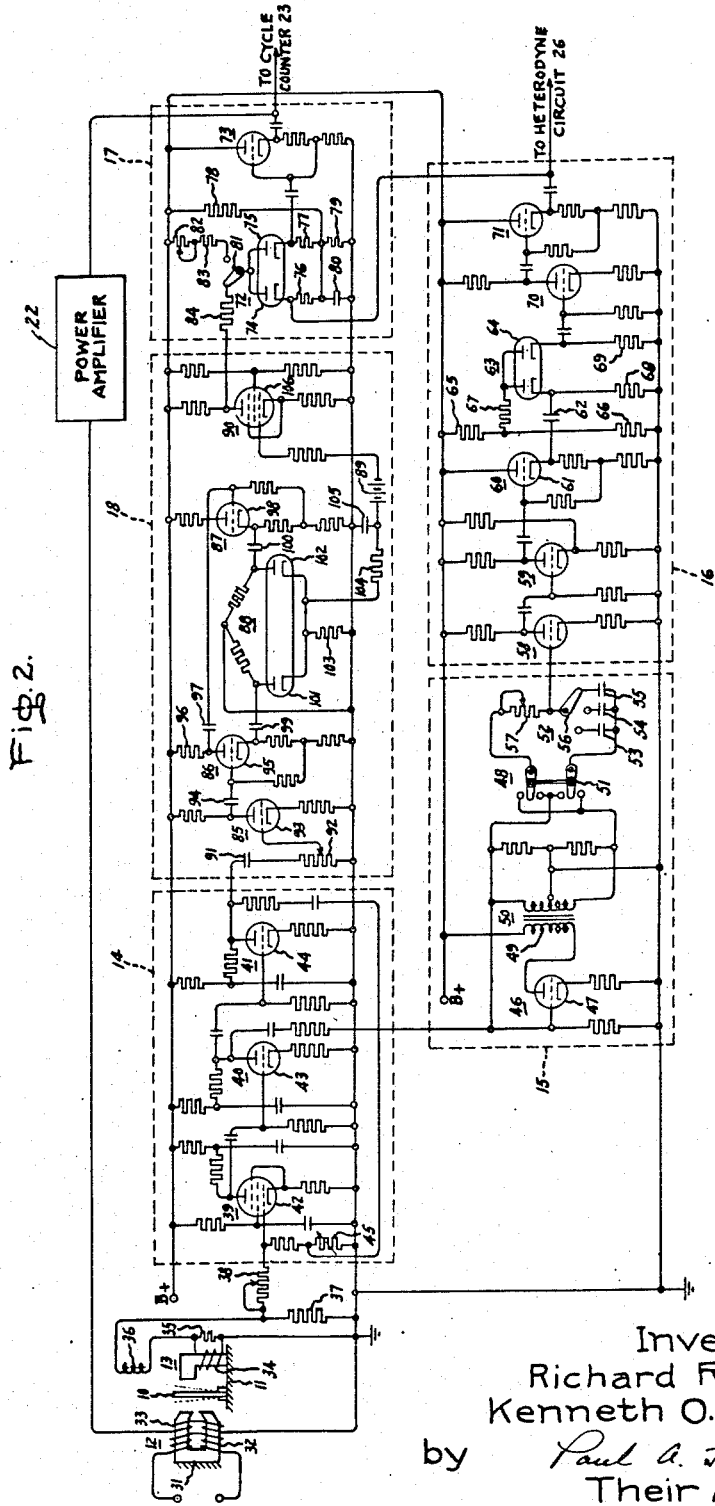

2,788,659

FATIGUE TESTING APPARATUS

Richard R. Radnar, Lynnfield Center, and Kenneth O. Straney, Beverly, Mass., assignors to General Electric Company, a corporation of New York Application September 17, 1951, Serial No. 246,986

5 Claims. (Cl. 73—67.4)

Our invention relates to vibration producing apparatus, and more particularly to apparatus for testing fatigue in specimens by enforcing vibrations in the specimen until the specimen cracks or displays other evidence of fatigue.

The customary method of testing fatigue by the use of specimen vibration is to enforce known amplitude vibrations in the specimen at its initial natural fundamental flexural resonant frequency by means of a driving constant frequency oscillator, and to attempt to maintain both the vibration amplitude and vibration frequency constant until a failure due to fatigue becomes evident. The fatigue characteristic of the specimen is then determined by the product of the vibration frequency and the elapsed time in seconds from the beginning of the test to the start of fatigue failure. While this method is suitable for general comparison between specimens of widely differing fatigue characteristics, many difficulties arise in attempting to obtain a truly accurate and reproducible determination of fatigue characteristics by the use of this method. One difficulty lies in the fact that the natural resonant frequency of the specimen tends to drop gradually during the course of the test. As a consequence, it is difficult to maintain a constant frequency of vibration. Moreover, changes in fatigue and resonant condition of the specimen as well as inherent variations in the driving force of the vibration inducing oscillator produce considerable changes in the amplitude of specimen vibration to introduce further inaccuracies into the fatigue determination. It is usually necessary, therefore, that an operator continually monitor the equipment throughout the test to keep the specimen in the desired state of resonant frequency and constant amplitude vibration.

Accordingly, one general object of our invention is to provide fatigue testing apparatus which does not contain the limitations inherent in apparatus employing the above described method, and which thereby enables a more accurate determination of the fatigue characteristics of a specimen.

Another general object of the invention is to provide a fatigue testing apparatus which need not be monitored by an operator during the course of the test.

In fulfillment of the above general objects, the invention has the further specific objects of providing a fatigue testing apparatus which enforces vibration of the specimen at its natural resonant flexural frequency throughout the course of the test despite changes in such resonant frequency as the test progresses; inherently maintains a preset amplitude of specimen vibration throughout the test; and automatically stops the test at the start of fatigue in the specimen.

In general, the invention comprises an electromechanical oscillatory circuit which is adapted to include the specimen to be tested as the oscillation frequency controlling element thereof. The phrase "electromechanical oscillatory circuit" is employed herein to define a closed loop oscillating circuit including an energy transformation between mechanical and electrical oscillations. Means are included in the oscillatory circuit for adjusting the magnitude of oscillatory electric energy and thereby controlling the amplitude of mechanical vibrations of the specimen. A source of substantially constant electric energy is also included in the circuit and is compared with an electrical magnitude representing the oscillatory energy to provide a difference energy signal connected to suitable specimen vibration enforcement means in order to compensate for any oscillatory energy amplitude variations away from a preset amplitude. Inasmuch as the frequency of oscillatory energy in the circuit is dependent upon the natural resonant frequency of the specimen, which drifts during the course of a fatigue test, a cycle counter is connected in the circuit to record the actual number of cycles of oscillatory energy occurring during the test interval. It has been found from experience that the start of fatigue failure in any specimen has a definite correlation with the degree of change in the natural resonant frequency of the specimen during the test; and means are also provided for extinguishing oscillations in the circuit in response to a predetermined change in the frequency of the oscillatory energy.

Novel features which we believe to be characteristic of our invention are set forth in the appended claims. Our invention itself, however, together with further objects and advantages thereof, may best be understood by reference to the following description taken in connection with the accompanying drawing in which Fig. 1 is a block diagram of a complete fatigue testing apparatus embodying our invention and Fig. 2 is a schematic circuit diagram of an electromechanical oscillatory circuit preferably employed in the apparatus of our invention.

Referring to Fig. 1, there is shown a block diagram of the apparatus embodying our invention for testing the fatigue of a specimen 10 which may comprise magnetic material, as shown, or may be of non-magnetic material with a magnetic pole piece or shoe (not shown) attached thereto. Specimen 10 is preferably in the form of a slab or plate rigidly secured at one end to a rigid support 11 with its other end free and subject to vibration. As is well known in the art, specimen 10 may assume various configurations and may be supported so as to be subject to different modes of vibration. For example, supports may be provided at both ends of the specimen 10 and lateral vibrations enforced at the center of the specimen.

The flat plate configuration and single end support for specimen 10 illustrated in the drawings is both simple and convenient for purposes of vibration amplitude measurement. An electromagnet 12 is employed to enforce mechanical vibrations in specimen 10 and is energized by an electric circuit to be described hereinafter which, in turn, is responsive to such enforced vibrations. Other electrically responsive vibration enforcement devices may alternatively be employed; for example, a piezoelectric transducer (not shown) arranged to produce specimen vibration by the force of compressional wave energy transmitted through a liquid medium. Specimen 10 need not be magnetic if these latter type vibration enforcing devices are substituted for electromagnet 12. The circuit for electrically energizing the vibration enforcement means such as electromagnet 12 is shown as comprising vibration pickup 13, vibration detector amplifier 14, phase shifter 15, amplifier and amplitude limiter 16, amplitude level controlling means such as controlled amplitude level limiter 17, and power amplifier 22. These components together with electromagnet 12 and specimen 10 form a closed loop comprising an electromechanical oscillatory circuit 30 described in greater detail below with reference to Fig. 2.

Vibration pickup 13 may be any suitable vibration sensing element preferably of the magnetic or capacitive pickup type which provides an electric signal responsive in frequency and amplitude to the frequency and amplitude of vibration of specimen 10. The alternating signal voltage provided by pickup 13 is amplified by vibration detector amplifier 14 and adjusted in phase by phase shifter 15 an amount necessary to reinforce vibrations of specimen 10 when ultimately supplied to energize electromagnet 12 through amplitude limiters 16 and 17 and power amplifier 22. By adjusting the amount of amplification in this electromechanical oscillatory loop, the amplitude of vibration of specimen 10 can also be adjusted to any desired value.

The amplifier and amplitude limiter 16 and the controlled amplitude level limiter 17 are included in this oscillatory circuit in order to maintain, together with a regulator 18 a constant amplitude of vibration in specimen 10 once the vibration is set to a desired amplitude. Regulator 18 is connected between the vibration detector amplifier 14 and the controlled amplitude level limiter 17 and comprises a rectifier 19, a voltage reference 20 and a D.-C. amplifier 21. Rectifier 19 receives from amplifier 14 an amplified voltage output of vibration pick up 13 and provides a unidirectional voltage varying in accordance therewith. This signal responsive unidirectional voltage is compared against the constant voltage reference 20 and the difference voltage is amplified and inverted in sense by D.-C. amplifier 21. A unidirectional output voltage is thereby produced by regulator 18 which varies inversely in accord with the amplitude variations of the signal provided by vibration pickup 13. The controlled amplitude level limiter 17 receives both the signal responsive unidirectional voltage output of regulator 18 as well as a constant amplitude alternating voltage output of amplitude limiter 16. This controlled amplitude level limiter 17 functions to provide an alternating output voltage which is responsive in frequency and phase to the input voltage supplied from amplitude limiter 16, but which has a magnitude varying in response to the unidirectional voltage supplied from regulator 18. The output voltage of controlled amplitude level limiter 17 is amplified by power amplifier 22 and supplied to energize electromagnet 12. Any tendency in the specimen to increase or decrease its amplitude of vibration is thus compensated by an opposite change in the energization of electromagnet 12. The frequency of vibration will still, however, always be determined by the natural resonant flexural frequency of specimen 10.

In the above described oscillatory circuit 30, the frequency varies in accord with the natural resonant frequency of specimen 10. Consequently, the oscillatory frequency cannot be employed to provide an accurate indication of the number of vibratory excursions of the specimen during the test interval. In the apparatus of our invention this measurement is obtained by employing a cycle counter 23 which provides an indication of the actual number of oscillatory cycles occurring during the test interval. This cycle counter 23 may comprise any of the well known devices available for this purpose, and may conveniently comprise a pulse forming circuit 24 which produces voltage pulses by differentiating the initial voltage rise of each input voltage cycle, and a decade counter 24a for counting these pulses. One suitable decade counter, for example, is described in U. S. Patent 2,402,372, granted to J. S. Compton and R. E. Mumma on June 18, 1946.

In order to stop the test automatically at the first signs of fatigue failure, or at any predetermined point in the fatigue test up to a complete shattering of the specimen 10, means are provided in our testing apparatus for monitoring the change in frequency occurring in the oscillatory circuit and for energizing a test shutoff relay whenever the frequency change reaches a predetermined magnitude. In Fig. 1 we have shown in block diagram one such automatic test-stopping apparatus 29 as comprising a local oscillator 25, a heterodyning circuit 26, a tuned frequency discriminator 27, and a voltage amplitude actuated relay 28 which is connected to shut off the electrical power supplied to oscillatory circuit 30 and thus extinguish the oscillations therein. Local oscillator 25 is constructed to provide an alternating voltage of adjustable constant frequency, and heterodyne circuit 26 receives this constant frequency voltage as well as a voltage derived from the oscillatory energy in the monitored electromechanical oscillatory circuit 30. In one mode of operation local oscillator 25 is tuned at the beginning of the test to the vibration frequency of the specimen so that heterodyne circuit 26 initially provides no output difference frequency voltage. As the natural resonant frequency of specimen 10 gradually drops during the course of the fatigue test, the frequency of the signal in the oscillatory circuit also drops and is compared in the heterodyne circuit 26 against the constant frequency produced by the local oscillator 25. This difference or "beat" frequency output voltage of the heterodyne circuit 26 is supplied to frequency discriminator 27 which is tunable to provide an output voltage whenever an input signal supplied thereto has a predetermined frequency. It has been found that the amount of frequency drift in the specimen may be used as a general indication of the fatigue condition thereof and that specimens having generally similar configuration and composition begin to give evidence of fatigue failure after similar changes in their resonant frequency during the vibration test. Frequency discriminator 27 is therefore pre-tuned to a frequency equal to the frequency change occurring up to the start of fatigue failure and provides a voltage to actuate relay 28 whenever the frequency difference between the voltages supplied to heterodyne circuit 26 from local oscillator 25 and oscillatory network 30 reaches this pre-tuned frequency.

In an alternative mode of operation, local oscillator 25 is tuned at the beginning of the test to a frequency equal to the sum of the specimen vibration frequency and the resonant frequency of tuned frequency discriminator 27 so that heterodyne circuit 26 initially provides a difference frequency output voltage whose frequency is the tuned frequency of frequency discriminator 27. As the natural resonant frequency of the specimen gradually drops during the course of fatigue test, the frequency of the signal in the oscillatory circuit also drops and is compared in heterodyne circuit 26 against the constant frequency produced by local oscillator 25. The difference or beat frequency output of heterodyne circuit 26 is supplied to frequency discriminator 27 which provides a parallel L—C resonance type of response at its pre-tuned resonant frequency. Hence, at the start of the test, the output of frequency discriminator 27 is a maximum, while this output falls off as the difference frequency changes, as produced by the drop in frequency of the specimen due to failure. The voltage sensitive relay 28 is adjusted to be actuated by a drop in output voltage of the discriminator circuit corresponding to the desired total change to be allowed in the specimen natural resonant frequency.

The components of this frequency monitoring automatic shutoff network 29 represented by blocks 25 through 28 are all well known to those skilled in electronic systems, and need not be further described here. A preferred embodiment of the electromechanical oscillatory circuit 30, however, is shown in schematic circuit diagram form in Fig. 2.

Referring to Fig. 2, we have shown electromagnet 12 as comprising a U-shaped core member 31 having a direct current bias winding 32 and an alternating current control winding 33 wound on the legs thereof. Electromagnet 12 is arranged to enforce, by its alternating magnetic field, vibrations at the free end of a specimen 10 which is rigidly secured at its other end to a suitable support 11. Vibration pickup 13 is illustrated as being of the magnetic reluctance type in which the change in air gap produced by the vibration of specimen 10 causes a change in the magnetic flux in the core of pickup 13 which induces a corresponding electric signal in a coil 34 wound on the core. Other types of vibration sensing elements such as capacity pickups may alternatively be employed. A small integrating resistor 35 is preferably connected in parallel with coil 34 to provide compensation for the output voltage vs. frequency characteristic of coil 34 and thus provide a vibration sensing device whose output voltage amplitude is somewhat independent of frequency over a prescribed range of frequencies. In order to minimize the effect of coupling between the pickup coil 34 and the electromagnet 12, an air turn coil 36 is preferably connected in series opposition with pickup coil 34 and arranged to have a voltage induced therein from electromagnet 12 that is equal to that induced in coil 34 with no specimen vibration. A zero signal voltage will thereupon be produced across coupling resistor 37 connected in series with coils 34 and 36 when no vibration is enforced in specimen 10, and any signal voltage produced thereafter will be the result solely of the specimen vibration. The specimen vibration signal voltage developed across resistor 37 is delivered to amplifier 14 through an attenuating means such as variable resistor 38.

Amplifier 14 is shown as a three-stage degenerative amplifier and comprises amplification stages indicated generally by numerals 39, 40, and 41 associated with electron discharge devices 42, 43 and 44 respectively. The amplification stages are conventional and need not be described in further detail. A degenerative feedback connection is preferably included from the anode of the last discharge device 44 back to the control electrode of the first discharge device 42. A variable grid return resistor 45 is preferably connected across the feedback voltage in order to enable an adjustment of the overall amplification of amplifier 14.

Amplifier 14 supplies amplifier oscillatory signal voltages to both regulator 18 and phase shifter 15. The voltage delivered to regulator 18 is shown as being derived from the anode of discharge device 44 while the voltage delivered to phase shifter 15 is shown as being derived from the voltage developed at the anode of device 43. Phase shifter 15 is shown as including an amplification stage 46 associated with an electron discharge device 47 and a 360-degree phase shifting network 48. Amplification stage 46 includes a primary winding 49 of a center-tapped transformer 50 in the anode-to-cathode circuit of discharge device 47. The center tap of transformer 49 is connected to ground and opposite ends of the secondary winding are connected through a polarity reversing switch 51 to a resistance-capacity phase shifting network 52. Three capacitors 53, 54, and 55 of different capacitance may each be selected by a selecting switch 56 to be connected in series with a variable resistor 57 in order to increase the range of phase shift over an entire 180 degree alternation. The polarity of the signal supplied to the phase shifting network 52 may be reversed by throwing switch 51 to an opposite position, so that a phase shift over the remaining 180 degrees and thus over the entire cycle may be achieved.

The phase shifted oscillatory signal voltage produced at the connection between the resistor 57 and the selected capacitor of the phase shifting network 52 is directly connected to a control electrode of an amplification stage 58 of the amplifier and limiter 16. The signal is further amplified in an amplification stage 59 and supplied to a cathode follower stage 60 associated with a triode discharge device 61. The output voltage developed across the cathode resistors of cathode follower 60 is supplied through a coupling capacitor 62 to an amplitude limiter or "clipper" stage 63.

Amplitude limiter 63 may be any known type which limits the amplitude of the incoming alternating signal to a predetermined constant value. The limiter 63 may conveniently be of the type that "cuts off" both the positive and negative excursions of the signal voltage above and below predetermined clipping levels. One such latter type of amplitude limiter is shown in Fig. 2 as comprising a double-diode electron discharge device 64 having its anodes connected together and to receive through a voltage dropping resistance 67 an energizing voltage from a voltage dividing network comprising resistors 65 and 66 connected between a source of high voltage potential and ground. Separate cathode resistors 68 and 69 are respectively connected from the cathodes of the two diode sections of discharge device 64 to ground. The voltage to be clipped is supplied to one cathode of discharge device 64, and the output clipped voltage is produced at the other cathode thereof. With this type of amplitude limiter circuit, the upper clipping level is determined by the point at which the voltage on the signal-receiving cathode exceeds the anode supply voltage provided by the voltage dividing network, and the lower clipping level is determined by the point at which the signal receiving diode becomes heavily conducting so as to cause the anode of the output diode to become negative with respect to its cathode. The circuit constants are preferably chosen so that the output signal will be a square voltage wave with a peak-to-peak amplitude of several volts. This output voltage is supplied to a further stage of amplification 70, and the output of stage 70 is supplied through a cathode follower stage 71 both to the controlled level limiter 17 and to heterodyne circuit 26, as shown in Fig. 1.

Controlled level limiter 17 is shown as including a variable amplitude level limiter stage 72 somewhat similar to limiter stage 63 and a cathode follower stage 73. Limiter 72 is shown as a pair of diodes 74 and 75 having their anodes interconnected and their respective cathodes connected through resistors 76 and 77 to a cathode biasing network comprising resistors 78 and 79 and an alternating current bypass capacitor 80. Anode voltage for diodes 74 and 75 is obtained through a selector switch 81 either from a constant source of high voltage potential, indicated as B+, through variable resistor 82 and fixed resistor 83 or from regulator 18 through resistor 84. The phase shifted constant amplitude alternating signal derived from limiter 16 is supplied to the cathode of diode 74. Limiter stage 72 functions to provide a square wave output voltage at the cathode of diode 75 which varies in phase and frequency in accord with the signal from limiter 16 but whose amplitude is dependent upon the anode voltage supplied to diodes 74 and 75 from either the high voltage supply or from regulator 18, depending upon the position of switch 81.

The amplitude of the anode voltage supplied to limiter stage 42 determines the amplitude of the output voltage of this stage in the following manner. Presume that the voltage supplied to the anodes of diodes 74 and 75 is 20 volts above the cathode biasing voltage in the absence of an input signal voltage delivered to the cathode 74 from limiter 16. Under this condition, the application from limiter 16 of a signal voltage having positive and negative constant amplitude excursions of 60 volts, for example, causes diode 74 to reach cut-off at the 20 volt level of positive-going excursions to impress the full anode voltage across diode 75 alone, and positive amplitude signal variations above this 20 volt level have no effect upon the conduction of diode 75. In a somewhat similar manner, negative excursions of the signal voltage cause diode 74 to conduct heavily so that the anode voltage of diode 74 follows the signal voltage. Since the anodes of diodes 74 and 75 are interconnected, the anode voltage of diode 75 thus drops below its biased cathode voltage, extinguishing conduction in diode 75. Negative going excursions of signal voltage below the bias level thus have no effect upon the output voltage developed at the cathode of diode 75, and the output voltage constitutes a square wave varying between the bias level and the level of anode voltage. Since the bias level is maintained constant, variations in the anode voltage, such as may be supplied from regulator 18, produce a linear variation in the amplitude of the output voltage produced by the limiter stage 72.

The output voltage of limiter stage 72 is supplied through cathode follower stage 73 to power amplifier 22. Power amplifier 22 may be any conventional type and is shown in block form. The output of power amplifier 22 is connected to energize electromagnet 12.

Regulator 18 is connected between amplifier 14 and the controlled level limiter 17, and serves to provide an anode voltage for limiter stage 72 which varies inversely from a preset amplitude in accord with any amplitude variations in the vibration of specimen 10. Regulator 18 comprises a gain controlled amplifier stage 85, a pair of cathode follower stages 86 and 87 connected in push-pull, a full-wave rectifier 88 connected between the respective output terminals of cathode follower stages 86 and 87, a source of unidirectional reference voltage 89, and a direct current amplifier 90. The voltage produced at the anode of discharge device 44 in amplifier 14 is coupled to amplification stage 85 through a coupling capacitor 91 to a potentiometer 92 connected in the control electrode-to-cathode circuit of a discharge device 93 associated with amplification stage 85. Adjustment of the tap of potentiometer 92 enables a control of the gain of amplification stage 85 from zero to a maximum value determined by the amplitude of the signal voltage coupled to regulator 18. The output of amplifier 85 is taken from the anode of discharge device 93 and supplied through coupling capacitor 94 to a control electrode of the discharge device 95 included in cathode follower stage 86. An anode resistor 96 is included in this cathode follower stage 86 and is so proportioned relative to cathode connected resistors to provide an anode voltage output from discharge device 95 having amplitude variations equal in magnitude to the variations supplied to the control electrode thereof but 180 degrees reversed in phase. This anode voltage of device 95 is supplied through coupling capacitor 97 to the control electrode of a discharge device 98 associated with cathode follower stage 87. Cathode follower stages 86 and 87 are preferably identical in construction. Due to the phase reversal of the equal amplitude signals supplied to their respective control electrodes, oppositely directed equal amplitude signals are developed at the cathodes of discharge devices 95 and 98 respectively. Full-wave rectifier 88 is connected through coupling capacitors 99 and 100 across the cathodes of devices 95 and 98 and may conveniently comprise a pair of diode rectifiers 101 and 102 which receive their anode voltage from the A. C. voltage supplied through coupling capacitors 99 and 100 and which utilize a common load resistance 103. The unidirectional voltage developed across load resistance 103 is supplied through a filter network comprising resistor 104 and capacitor 105 to one side of a source of unidirectional constant reference voltage, shown as battery 89, whose other side is connected to the control electrode of a pentode discharge device 106 included in the direct current amplification stage 90. The polarity of battery 89 is such as to produce a voltage opposing the voltage developed across load resistor 103 so that the effective voltage supplied to the control electrode of discharge device 106 is the difference between the magnitude of the battery voltage and that produced by rectifier 88. As will be more fully explained in connection with the operation of the invention, during normal operation the unidirectional output voltage of rectifier 88 is slightly greater than that produced by battery 89 with the result the voltage on control electrode of discharge device 106 increases with an increase in amplitude of the input voltage supplied to the regulator. The absolute magnitude of this voltage change, however, is related to the reference level set by battery 89. Direct current amplification stage 90 is similar to a conventional alternating current amplification stage with the exception that no direct current blocking capacitor is included between the anode of the discharge device 106 and the controlled level limiter 17. Due to the inversion in phase at the anode of discharge device 106 of voltage changes supplied to the control electrode thereof, an increase in the amplitude of the alternating signal voltage supplied to the regulator 18 appears as a corresponding decrease in the amplitude of the unidirectional voltage supplied to the anodes of the amplitude limiting diode discharge devices 74 and 75 from the anode of discharge device 106.

In the operation of the fatigue testing apparatus of our invention, switch 81 in the controlled level limiter stage 72 is thrown to a position where the anodes of diodes 74 and 75 receive a constant voltage directly from the high voltage source through resistors 82 and 83. Resistor 82 is adjusted to a proper operating point relative to the bias voltage developed across resistor 79 and supplied to the cathodes of diodes 74 and 75. The anode voltage may be adjusted to be, for example, about 30 volts higher than the bias voltage supplied to the cathodes. In phase shifter 15 the proper capacitor is selected through switch 56, and resistor 57 is adjusted until the phase of the signal fed back to electromagnet 12 exactly coincides with the natural vibrational phase of specimen 10 to establish specimen vibrations. Resistors 38 and 45 are then adjusted until the vibration of specimen 10 reaches a predetermined desired value. Switch 81 is then thrown to the automatic position in which the anodes of diodes 74 and 75 receive voltage from regulator 18, and the gain of regulator 18 is adjusted by varying resistor 92 until the voltage on diodes 74 and 75 reaches the same value as previously existed with switch 81 thrown in the constant reference voltage-receiving position. Local oscillator 25 is then tuned until there is a zero output frequency signal from the heterodyne circuit 26, thus indicating that the local oscillator is tuned to the frequency of the oscillatory energy in oscillatory circuit 30. The cycle counter 23 may be turned on whenever the vibration of specimen 10 reaches the desired constant amplitude. Due to the control action of regulator 18, specimen 10 thereupon continues to vibrate with this predetermined constant amplitude until the natural resonant frequency of the specimen drifts to a sufficient extent to energize the tuned frequency discriminator 27, which, in turn, energizes relay 28 to shut off automatically the high voltage power supplied to oscillatory circuit 30 and thus terminate the test.

Although we have described above a particular embodiment of fatigue testing apparatus according to our invention, many modifications can be made. It is not essential that the phase shifter 15 be located in the particular position in the oscillatory loop described above, but may, for example, be located after the amplitude limiter 16 or after the controlled level limiter 17. Similarly, it is not essential that the frequency monitoring shut-off circuit 29 should receive its energizing signal from the particular point in the oscillatory circuit shown in the drawings but may be energized by any voltage of sufficient amplitude derived from the oscillatory energy in oscillatory circuit 30. This is, of course, also true with regard to the energizing signal supplied to cycle counter 23. Many other modifications can, of course, be made, and we intend by the appended claims to cover all such modifications as fall within the true spirit and scope of our invention.

What we claim as new and desire to secure by Letters Patent of the United States is:

1. In fatigue testing apparatus of the type including an electromagnetic oscillatory circuit adapted to include a specimen to be tested as its oscillation frequency controlling element, means for providing a unidirectional voltage responsive in amplitude to variations in vibrational amplitude of a specimen, means including a source of substantially constant reference unidirectional voltage connected to oppose said vibration amplitude responsive unidirectional voltage for providing a difference voltage varying inversely in accord with the amplitude variations of the specimen vibrations, a controlled amplitude level limiter circuit including a double diode amplitude limiter stage, means for delivering said difference voltage to the anodes of both said diodes, means for delivering to the cathode of one of said diodes a constant amplitude voltage responsive in frequency to the vibration frequency of said specimen, and voltage responsive means connected to receive the voltage developed at the cathode of the other of said diodes for enforcing vibration of said specimen, whereby oscillations in said oscillatory circuit are maintained at a constant amplitude despite changes in the natural resonant flexural frequency of said specimen.

2. Fatigue testing apparatus comprising an electromagnet arranged to enforce, by its magnetic field, vibrations in the specimen to be tested, vibration sensing means constructed and arranged to provide an electric signal responsive in amplitude and frequency to the enforced vibrations of the specimen to be tested, means for rectifying a voltage derived from said signal, means including a source of substantially constant unidirectional voltage connected to oppose said rectified voltage for providing a unidirectional difference voltage varying inversely in accordance with the amplitude variations of said signal, means connected to receive a signal from said sensing means for amplifying and shifting the phase thereof to provide a voltage of constant amplitude regardless of variations in frequency and of a frequency equal to the instantaneous natural flexural frequency of the specimen, a controlled amplitude level limiter circuit including a dual diode amplitude limiter stage, means for delivering said difference voltage to the anode of both said diodes to vary the anode voltage thereof in accordance with said difference voltage, means for delivering to the cathode of one of said diodes the constant amplitude voltage derived from said amplifying and phase shifting means, and voltage responsive means connected to receive the voltage developed at the cathode of the other of said diodes to obtain an alternating voltage responsive in frequency to the frequency of said signal but varying inversely in accordance with the amplitude variations of said signal for enforcing vibrations of said specimen.

3. Testing apparatus as recited in claim 2 wherein said means for delivering a constant amplitude voltage to the cathode of one of said diodes comprises an amplitude clipping device having a square wave output.

4. A signal amplitude limiter comprising a signal input circuit, a dual diode amplitude limiter stage, means connected to the anodes of both said diodes for delivering unidirectional voltage having an amplitude inversely proportional to the amplitude of the input signal derived from said circuit, means connected to the cathode of one of said diodes for delivering a constant amplitude voltage responsive in frequency to the input signal frequency, an output circuit connected to the cathode of the other of said diodes to receive an output voltage responsive in frequency to the frequency of said signal and of an amplitude which varies inversely with the amplitude of said signal regardless of changes in the frequency of the signal and of an amplitude which varies inversely with the amplitude of said signal regardless of changes in the frequency of the signal.

5. A signal amplitude limiter comprising a signal input circuit, a dual diode amplitude limiter stage, means connected to the anodes of both of said diodes for delivering variable unidirectional voltage derived from the input signal of said circuit, means connected to the cathode of one of said diodes for delivering a constant amplitude voltage responsive in frequency to the frequency of said input signal, and means connected to receive the voltage developed at the cathode of the other of said diodes to obtain an output signal having an amplitude independent of the frequency of the input signal.

References Cited in the file of this patent

UNITED STATES PATENTS

| | | |
|---|---|---|
| 2,300,926 | Hutcheson | Nov. 3, 1942 |
| 2,301,648 | Thompson | Nov. 10, 1942 |
| 2,361,396 | Gross | Oct. 31, 1944 |
| 2,373,351 | Sims | Apr. 10, 1945 |
| 2,466,959 | Moore | Apr. 2, 1949 |
| 2,500,764 | MacGeorge | Mar. 14, 1950 |
| 2,621,290 | Andresen | Dec. 9, 1952 |
| 2,625,659 | Mendelson | Jan. 13, 1953 |
| 2,675,698 | Johnson | Apr. 20, 1954 |
| 2,709,716 | Haller | May 31, 1955 |
| 2,730,615 | Mantz | Jan. 10, 1956 |

FOREIGN PATENTS

| | | |
|---|---|---|
| 907,069 | France | June 11, 1945 |
| 627,543 | Great Britain | Aug. 10, 1949 |